June 10, 1958   E. LONG ET AL   2,838,451
GAS COOLED NUCLEAR REACTORS
Filed Nov. 14, 1955   3 Sheets-Sheet 2

June 10, 1958     E. LONG ET AL     2,838,451
GAS COOLED NUCLEAR REACTORS

Filed Nov. 14, 1955     3 Sheets-Sheet 3

# United States Patent Office 2,838,451
Patented June 10, 1958

2,838,451
GAS COOLED NUCLEAR REACTORS

Everett Long, Culcheth, and William Rodwell, Widnes, England, assignors, by mesne assignments, to the United States of America as represented by the United States Atomic Energy Commission Application November 14, 1955, Serial No. 546,363

5 Claims. (Cl. 204—193.2)

This invention relates to gas-cooled nuclear reactors of the kind comprising a graphite reacting core and reflector structure supported in a containing vessel, such as a pressure vessel, and it is concerned with the provision of gas sealing means for sealing between the walls of the graphite structure and the containing vessel to prevent the gas coolant by-passing the reacting core. For a disclosure of reactors with which this invention may be adapted, reference is made to U. S. Patent 2,708,656 issued to E. Fermi et al.

There are three main problems in providing a seal between the walls of a graphite structure and a containing vessel. The first problem arises from thermal expansion differences. The graphite and the vessel move relative to one another in both radial and axial directions as temperatures change. To quote one example, a pressure vessel 30' in diameter and supporting from its base a vertical graphite structure 29' in diameter and 29' high have relative thermal expansion movements of about 1" at the greatest diameter and at the top of the graphite structure for a temperature change of 300° C. Hence, it follows that a seal provided at or near the top of such a graphite structure will have to contend with a maximum axial movement and therefore, from a thermal expansion aspect, the seal is preferably provided at the base where there is minimum axial movement.

The second problem arises from pressure differences throughout the length of the graphite structure. A graphite structure conventionally comprises a mass assembled from uncemented bricks which would readily blow apart under positive pressure inside the structure unless there was a counter-balancing pressure on the walls. When a seal is introduced around the structure the pressure drop throughout the structure appears also across the seal so that on one side of the seal there will be a counter-balancing pressure on the walls whilst on the other side there will be no such pressure. With the seal at the gas outlet end of the graphite structure the problem of an explosive pressure does not arise, but with the seal at the gas inlet end of the graphite structure (as preferred for thermal expansion reasons in a vertically orientated reactor) the explosive pressure above the seal must be accommodated.

The third problem arises in the assembly of the reactor inside its containing vessel. Operating spaces are limited and the reactor must be kept clean during assembly which limits fabrication techniques inside the vessel. Any seal must therefore be of a type which allows internal assembly with the minimum of internal working.

According to the present invention gas sealing means for sealing between a gas-cooled graphite reacting core and reflector structure and a containing vessel comprises a flange around the inner wall of the vessel, a sectionalised ring of close fitting flexible webs supported on said flange and directed radially inwards into slots in the graphite structure and means thickening the webs at their inner edges.

Preferably two spaced rings of flexible webs are provided so that a safeguard exists should one fail. The two rings also double the resistance to the inevitable leaks through the seal.

A gas seal embodying the invention will now be described with reference to the accompanying drawings wherein:

Fig. 2b is a cut-away view of Fig. 2a.

Figure 1:
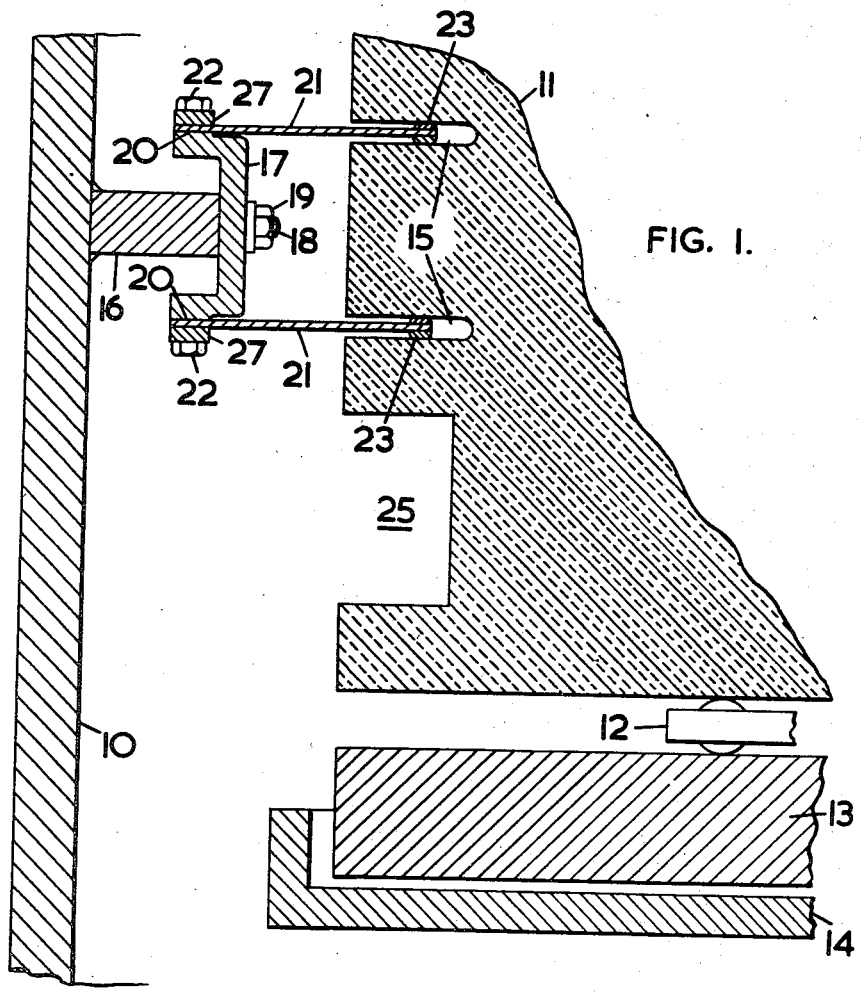
Fig. 1 is a sectional elevation showing a gas seal between a fragment of a pressure vessel and a graphite reacting core and reflector structure.

In Fig. 1 a pressure vessel 10 of 2" thick welded steel plate contains a 24-sided right prismatic graphite reacting core and moderator structure 11 supported on roller bearings 12 running on a 4" thick base plate 13. The plate 13 is supported on a steel grid 14 mounted on the dished-end of the vessel 10.

The graphite structure 11 has a pair of parallel circumferential slots which are 4" deep and 5/8" wide. The vessel 10 has a flange 16 welded at one level around its inner wall. The flange is shaped to present a 24-sided aperture by its inner edges, matching with the 24 sides of the graphite structure. Twenty-four channel-section members 17 are mounted on the flange 16 by 5/8" shouldered studs 18 and nuts 19. Shaped spacers 29 (Fig. 2b) are fitted between the ends of the members 17 to complete the corners. The shouldered studs 18 are screwed into a counterbore in the flange 16 and prevented from unscrewing by peening of the flange metal around the shoulder. The members 17 have machined faces 20 and, on these faces, flexible webs 21 are secured by bolts 22 acting through a metal strip 27. The webs are 8" wide and are made of 3/16" steel plate chrome plated. At the inner edges of the webs 21 steel thickeners 23 are secured by rivets 24 (Fig. 2a). The thickeners 23 are curved, polished and chrome plated with the webs 21 and they offer a total clearance of .005" in the slots 15. A circumferential recess 25 is provided in the graphite structure 11 for a circumferential tensile restraining band or garter.

Figure 2:
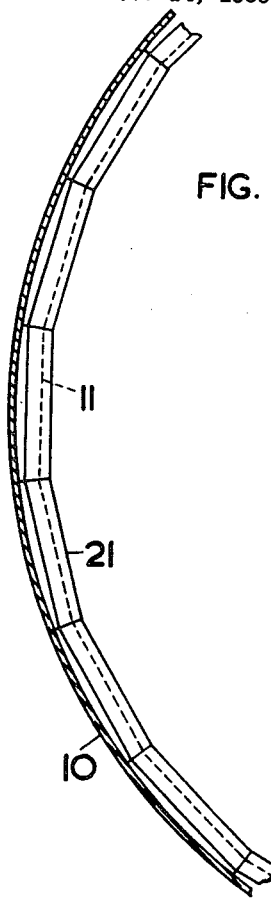
Fig. 2 is a plan view of a part of the seal.
Figure 2A:
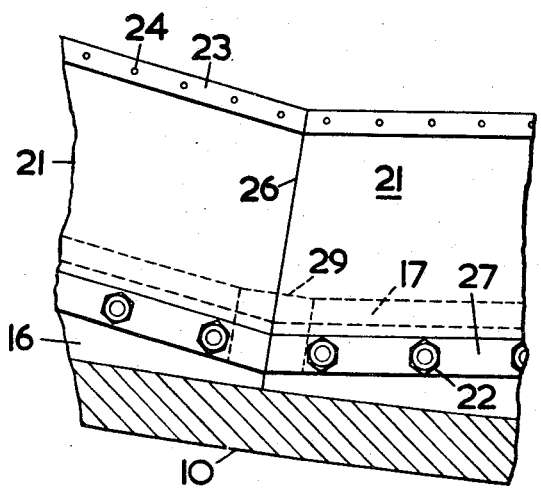
Fig. 2a is a plan view of a corner join between two sections of the seal.
Figure 2B:
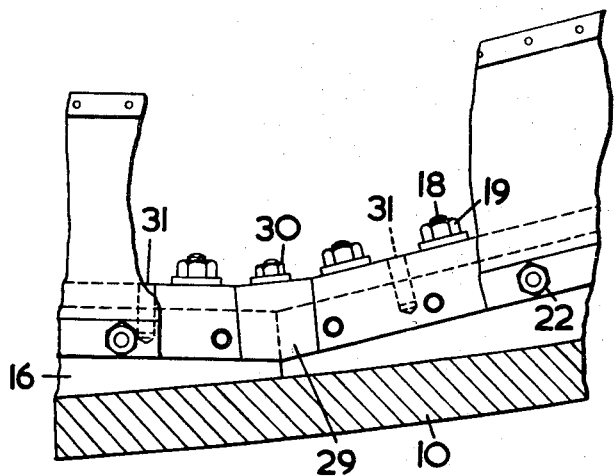

In Fig. 2, which is to a greatly reduced scale relative to Fig. 1, about one quarter of the circumference of the pressure vessel 10 at the level of the seal is shown. The seal is shown as comprising a sectionalised ring, each section consisting of a pair of parallel webs 21 with thickeners 23 (not shown on this figure). The outline of the graphite structure is indicated by the dotted line 11.

Fig. 2a shows the join 26 between two webs 21. The join is radial with a slight gap (.005") which ensures that fouling and buckling of webs cannot occur as the reactor cools. The strip 27, the bolts 22, the thickeners 23, the rivets 24, the flange 16 and the pressure vessel 10 are also shown on this figure. Dotted in this figure is the member 17 and spacer 29 shown in more detail in the Fig. 2b. Spacers 29 are made individually for each corner and are held in position by a 3/8" stud, nut and washer 30. Dowel holes 31 are provided for a purpose to be referred to later.

Figure 3:
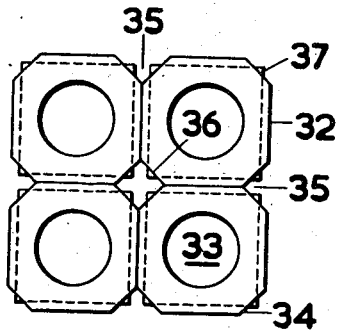
Fig. 3 is a diagrammatic plan view of a part of a graphite structure.

In Fig. 3 there is shown, in plan, a section on four adjacent graphite blocks 32 having central fuel element channels 33. These blocks form a part of the top layer of the graphite structure 11 and are in contact with one another along their side walls. The corners of the blocks 32 have chamfered faces 34 to form diamond-section channels 36. The next lowest layer of bricks 37 are spaced apart by spaces 35 to allow for growth of the bricks under irradiation and this pattern is repeated until the bottom layer of bricks is reached. It is inevitable that gas will leak from the channels 33 across the end faces of the bricks and will pass to the spaces 35. These spaces 35 are effectively closed at the base of the graphite structure but are open at the top via the channels 36 so that the pressure in them, and hence the pressure tending to explode the graphite structure, is sensitive to the pressure at the top of the structure. It is arranged that the coolant gas passes upwards through the graphite structure so that the pressure at the top of the structure is the lowest and despite the fact that the pressure drop through the structure appears also across the seal the explosive forces are relieved via the channels 36, the principal internal pressure drop between channels 33 and 36 taking place in the narrow gaps across the end faces of the bricks.

In the assembly of the seal, the outer blocks of the graphite structure which have to provide the slots 15 are machined before assembly. These slots can be accurately machined relative to the base of the graphite. The flange 16 complete with studs 18 is welded into position with a convenient accuracy. The grid 14 and plates 13 are put in position followed by the members 17 with webs 21 loose fitted. The member 17 is adjusted until it is of a correct height relative to a datum taken as the top of the plates 13. The webs 21 are adjusted to set up the gap 26 at .005″ and all nuts tightened. The .5″ diameter holes to accommodate the dowels 31 (Fig. 2b) are drilled and the spacers 29 are machined. The members 17 are then released and removed so that the graphite can be installed and fitted with a restraint band in recess 25. The members 17 are then replaced in their original locations, dowelled at 31 to locate them accurately, secured by nuts 19 and the heads of the studs 18 peened over.

Figure 4:
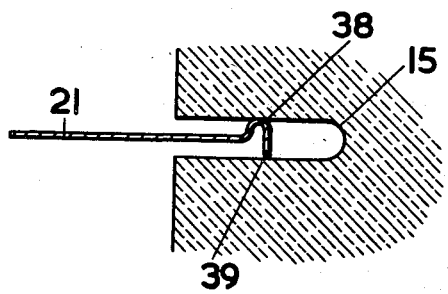
Figs. 4 and 5 are sectional views of modified parts of the seal.

In the modified arrangements shown in Fig. 4 the steel thickeners 23 shown in Figs. 2 and 2a are replaced by curving the inner edges of the webs 21 as shown by the reference numeral 38. The tip 39 of the web is rounded to allow easy movement in the slot 15 and to avoid scuffing. The dimensions of the curved pad 38 are such as to allow clearances of .005″ whilst keeping the web 21 centralised in the slot 15.

Figure 5:
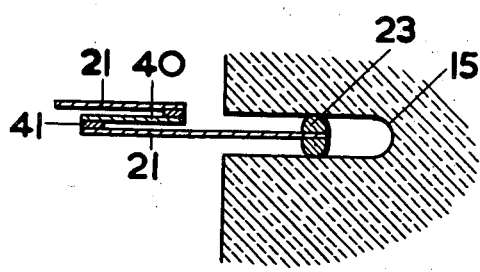

In Fig. 5 the web 21 is made in a folded section by means of an intermediate member 40 and welded spacers 41. This arrangement may be used to allow larger movements of the graphite structure 11 without overstressing the web 21.

We claim:

1. A gas seal for sealing the interstice between a multi-sided right prismatic structure and a cylindrical vessel containing said structure, said structure having a pair of parallel slots around its periphery, said seal comprising a flange around the inner wall of the vessel midway between the two slots in said structure and forming an aperture conforming to the cross-sectional shape of the structure, a support member around the periphery of said aperture formed of a number of individual channel section members conforming to the number of sides to said structure adjustably attached to said flange, a flexible web adjustably attached at one end to each leg of each of said channel-sectioned members and extending radially inward so that its other end resides in one of the slots in the structure and means thickening the webs at the ends residing in the slot.

2. A gas seal as claimed in claim 1 wherein said webs have a folded shape in section.

3. A gas seal as claimed in claim 1 wherein said means thickening webs at their inner edges comprise metal strips of smooth curved section attached to both sides of the web so as to locate the webs centrally in the slots in the structure.

4. A gas seal as claimed in claim 1 wherein said webs are terminated at their inner edges in smooth hook shaped folds to maintain the webs located centrally in the slots in the structure.

5. An apparatus comprising a plurality of equidimensioned graphite moderator blocks each having an aperture therein, said blocks arranged in layers, the apertures in the blocks of each layer being aligned to form channels throughout the length of said apparatus, the blocks in each layer being arranged adjacent one another with spaces therebetween to provide for lateral expansion of said blocks, a second plurality of graphite moderator blocks each having an aperture therein, the blocks of the second plurality being arranged in a top layer over said first layers with the apertures therein positioned in line with the channels so formed, the blocks in said top layer being larger than the blocks in said first layers so that adjacent blocks in the top layer abut one another along their lateral faces, said blocks in the top layer having their lateral edges perpendicular to the plane of said top layer chamfered, the assembly of blocks having a pair of parallel slots around its periphery near its bottom end; a vessel containing the assembly of graphite blocks, a flange around the inner wall of the vessel midway between the two slots in the assembly of blocks forming an aperture conforming to the cross-sectional shape of the assembly of blocks, a support member around the periphery of the aperture formed of a number of individual channel section members adjustably attached to said flange, a flexible web adjustably attached at one end to each leg of each of said channel section members and extending radially inward so that its other end resides in one of the slots in the assembly, and means thickening the webs at the ends residing in the slot.

References Cited in the file of this patent

UNITED STATES PATENTS

| 878,238 | Rollins | Feb. 4, 1908 |
| 2,402,927 | Stupakoff | June 25, 1946 |
| 2,514,976 | Stivin | July 11, 1950 |
| 2,708,656 | Fermi et al. | May 17, 1955 |

OTHER REFERENCES

Harwell: The British Atomic Energy Research Establishment, 1946–1951, London, Her Majesty's Stationery Office, pp. 95–97.